(12) United States Patent
Barillaud et al.

(10) Patent No.: US 7,958,241 B2
(45) Date of Patent: *Jun. 7, 2011

(54) METHOD AND SYSTEM FOR OPTIMALLY ALLOCATING A NETWORK SERVICE

(75) Inventors: Franck Barillaud, Austin, TX (US); Xiaoping Chen, Austin, TX (US); Christopher M. Morrissey, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/371,762

(22) Filed: Feb. 16, 2009

(65) Prior Publication Data
US 2009/0144427 A1 Jun. 4, 2009

Related U.S. Application Data

(63) Continuation of application No. 09/738,371, filed on Dec. 15, 2000, now Pat. No. 7,502,857.

(51) Int. Cl.
G06F 15/173 (2006.01)
G06F 15/16 (2006.01)
G01R 31/08 (2006.01)
G06F 15/177 (2006.01)

(52) U.S. Cl. ......... 709/226; 709/224; 370/241; 715/734

(58) Field of Classification Search .................. 709/205, 709/223–224, 226, 232, 235; 370/252, 254; 715/734; 700/25

See application file for complete search history.

(56) References Cited

U.S. PATENT DOCUMENTS

| | | | |
|---|---|---|---|
| 5,404,451 A | 4/1995 | Nemirovsky et al. |
| 5,598,532 A | 1/1997 | Liron |
| 5,666,486 A | 9/1997 | Alfieri et al. |
| 5,729,472 A | 3/1998 | Seiffert et al. |
| 5,878,420 A | 3/1999 | de la Salle |
| 5,881,284 A | 3/1999 | Kubo |
| 5,909,217 A | 6/1999 | Bereiter |
| 5,951,634 A | 9/1999 | Sitbon et al. |
| 5,999,712 A | 12/1999 | Moiin et al. |
| 6,026,425 A | 2/2000 | Suguri et al. |
| 6,049,774 A | 4/2000 | Roy |
| 6,058,102 A | 5/2000 | Drysdale et al. |
| 6,070,197 A | 5/2000 | Cobb et al. |
| 6,078,946 A | 6/2000 | Johnson |
| 6,098,093 A | 8/2000 | Bayeh et al. |
| 6,112,239 A | 8/2000 | Kenner et al. |
| 6,175,869 B1 | 1/2001 | Ahuja et al. |
| 6,185,601 B1 | 2/2001 | Wolff |
| 6,230,200 B1 | 5/2001 | Forecast et al. |
| 6,279,032 B1 | 8/2001 | Short et al. |
| 6,631,128 B1 | 10/2003 | Lemieux |
| 6,728,748 B1 | 4/2004 | Mangipudi et al. |
| 6,760,775 B1 | 7/2004 | Anerousis et al. |
| 6,854,013 B2 | 2/2005 | Cable et al. |

*Primary Examiner* — Philip J Chea
(74) *Attorney, Agent, or Firm* — Yee & Associates, P.C.; Jeffrey S. LaBaw

(57) ABSTRACT

A network service allocation device is disclosed. The device comprises a probe, a module, and an engine. The device collects performance data relating to the physical characteristics of a distributed data processing system. The module utilizes the performance data to identify two or more node clusters on the distributed data processing system. The engine correlates the node clusters and one or more performance rules as related to the network service to provide a map of node cluster(s) for supporting the network service, or a list of one or more servers within a node cluster for supporting the network service.

10 Claims, 7 Drawing Sheets

METHOD AND SYSTEM FOR OPTIMALLY ALLOCATING A NETWORK SERVICE

This application is a continuation of application Ser. No. 09/738,371, filed Dec. 15, 2000, status allowed.

BACKGROUND OF THE INVENTION

1. Field of the Invention

The present invention generally relates to the field of computer network management, and more particularly relates to allocating a network services among servers within the network.

2. Description of the Related Art

A client-server relationship involves the client sharing the resources of the server, and the server performing necessary services for the client. In a network including multiple clients and servers, each server within the network performs one or more installed services for most, if not all, of the clients of the network. For example, one of the servers of the network can provide a directory service for clients. In a network having a high distribution of services among the servers, the location of a server within the network affects the efficiency of the access by clients of the service(s) provided by the server. In view of the increasing complexity of networks, it is becoming unfeasible for an administrator of the network to decide each location to install a service or to utilize a pre-defined configuration in allocating services among the servers. The computer industry is therefore continually striving to improve upon methods and systems for optimally allocating network services among servers.

SUMMARY OF THE INVENTION

One form of the present invention is a method for allocating a service on a network having a plurality of interconnected nodes. First, performance data representative of a set of physical characteristics of the network is collected. Second, two or more node clusters of the network based on the performance data are identified. Third, the node clusters and one or more performance rules as related to the service are correlated to identify each node cluster suitable for supporting the service.

A second form of the present invention is a distributed computing system comprising interconnected nodes and a server operable to allocate a service for the nodes. The server includes a probe, a module, and an engine. The probe is operable to provide performance data as related to a set of physical characteristics of the interconnected nodes. The module is operable to provide node clusters in response to the performance data. The engine is operable to utilize one or more performance rules as related to the service to identify a specific node cluster for supporting the service.

A third form of the present invention is a computer program product comprising a means for collecting a performance data relating to a set of physical characteristics of a network; a means for identifying node clusters of the network in response to performance data; and a means for correlating the node clusters and one or more performance rules for the node clusters as related to the service.

The foregoing forms and other forms, features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1A:
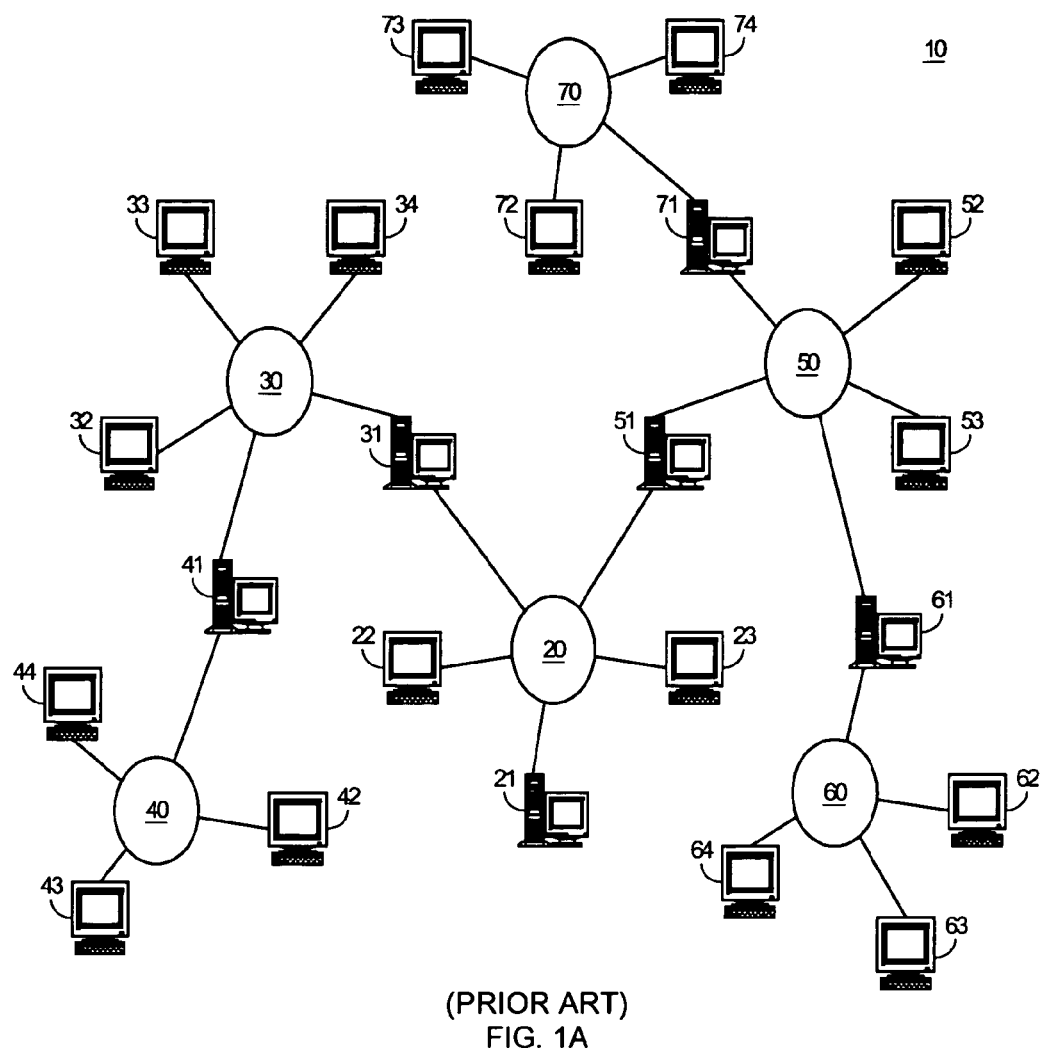
FIG. 1A is schematic diagram of a network of data processing systems as known in the art.

With reference now to the figures, FIG. 1A depicts a typical network of data processing systems. Each of the data processing systems shown in FIG. 1A may implement the present invention. Distributed data processing system 10 contains a network 20, a network 30, a network 40, a network 50, a network 60, and a network 70, which are the media used to provide communications links between various devices and computers connected together within distributed data processing system 10. Network 20, network 30, network 40, network 50, network 60, and network 70 may include permanent connections, such as wire or fiber optic cables, or temporary connections made through telephone or wireless communications.

In the depicted example, a server 21, a client 22, a client 23, a server 31, and a server 51 are connected to network 20; server 31, a client 32, a client 33, a client 34, and a server 41 are connected to network 30; server 41, a client 42, a client 43, and a server 44 are connected to network 40; server 51, a client 52, a client 53, a server 61, and a server 71 are connected to network 50; server 61, a client 62, a client 63, and a client 64 are connected to network 60; and server 71, a client 72, a client 73, and a client 74 are connected to network 70. Clients 22, 23, 32-34, 42-44, 52, 53, 62-64, and 72-74, and servers 21, 31, 41, 51, 61, and 71 are nodes of distributed data processing system 10 that may be represented by a variety of computing devices, such as mainframes, personal computers, personal digital assistants (PDAs), etc. Distributed data processing system 10 may include additional servers, clients, networks, routers, and other devices not shown. Those of ordinary skill in the art will appreciate that each server 21, 31, 41, 51, 61, and 71 provides one or more assigned services, e.g., lodging service, authentication service, gateway service, etc., for distributed data processing system 10.

Distributed data processing system 10 may include the Internet with network 20, network 30, network 40, network 50, network 60, and network 70 representing a worldwide collection of networks and gateways that use the TCP/IP suite of protocols to communicate with one another. Of course, distributed data processing system 10 may also include a number of different types of networks, such as, for example, an intranet, a local area network (LAN), or a wide area network (WAN).

The present invention could be implemented on a variety of hardware platforms. FIG. 1A is intended as an example of a heterogeneous computing environment and not as an architectural limitation for the present invention.

Figure 1B:
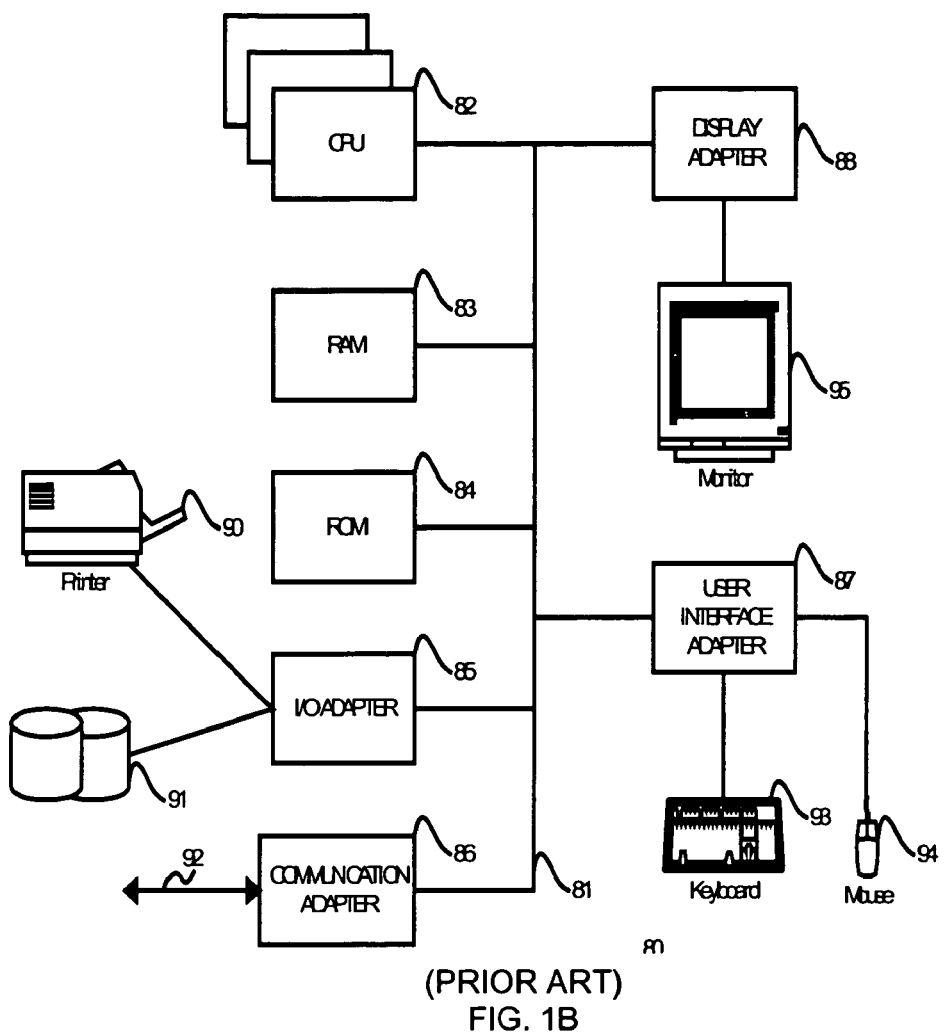
FIG. 1B is a schematic diagram of a computer architecture of a data processing system as known in the art.

With reference now to FIG. 1B, a diagram depicts a typical computer architecture of a data processing system, such as those shown in FIG. 1A, in which the present invention may be implemented. Data processing system 80 contains one or more central processing units (CPUs) 82 connected to internal system bus 81, which interconnects random access memory (RAM 83, read-only memory (ROM) 84, and input/output adapter 85, which supports various I/O devices, such as printer 90, disk units 91, or other devices not shown, such as a sound system, etc. A communication adapter 86, a user interface adapter 87, and a display adapter 88 are also connected to bus 81. Communication adapter 86 provides bus 81 with access to a communication link 92. User interface adapter 87 connects bus 81 to various user devices, such as keyboard 93 and mouse 94, or other device not shown, such as a touch screen, stylus, etc. Display adapter 88 connects bus 81 to a display device 95.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted example is not meant to imply architectural limitations with respect to the present invention. In addition to being able to be implemented on a variety of hardware platforms, the present invention may be implemented in a variety of software environments. A typical operating system may be used to control program execution within the data processing system.

Figure 2A:
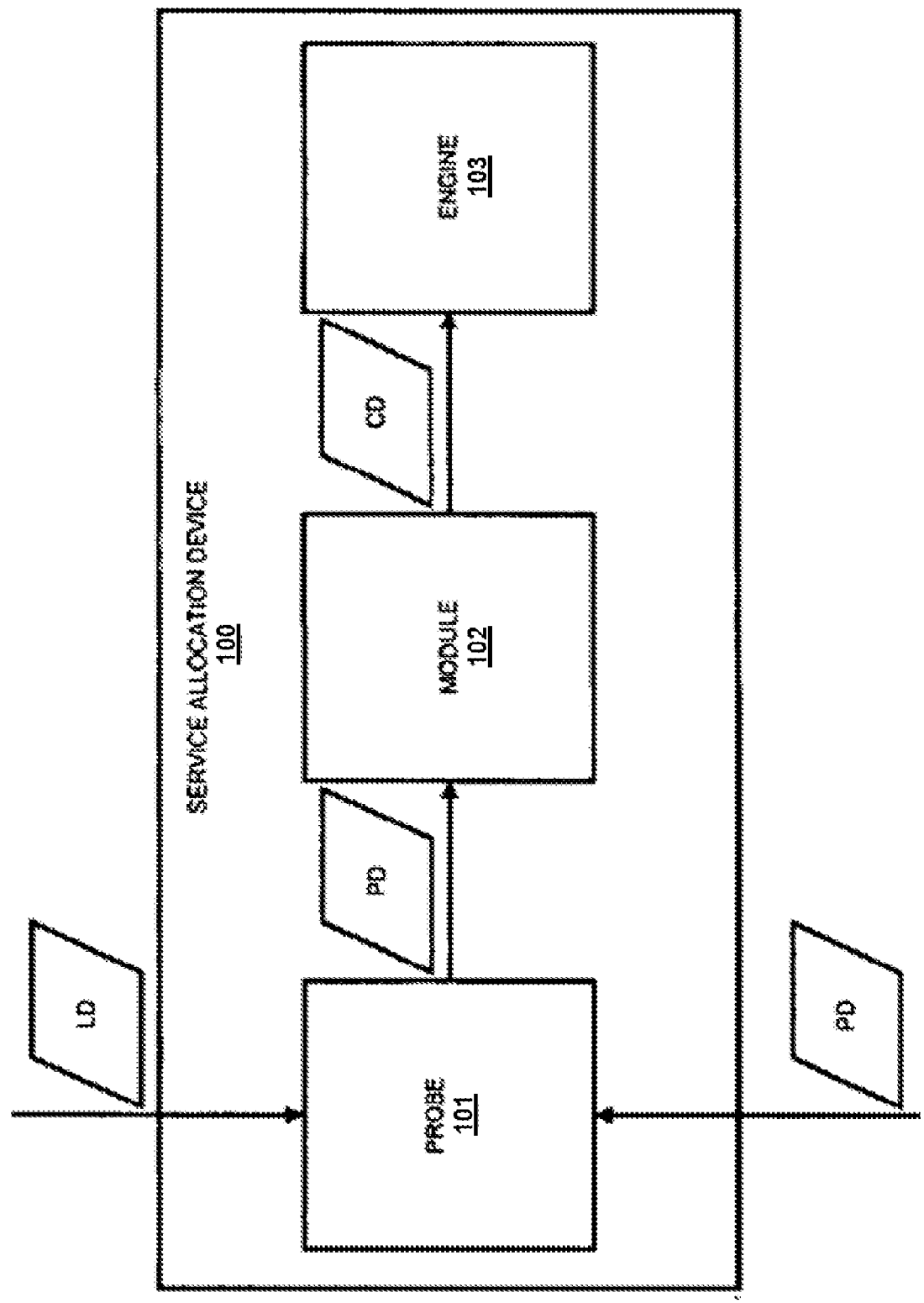
FIG. 2A is a block diagram of one embodiment of a service allocation device in accordance with the present invention.
Figure 2B:
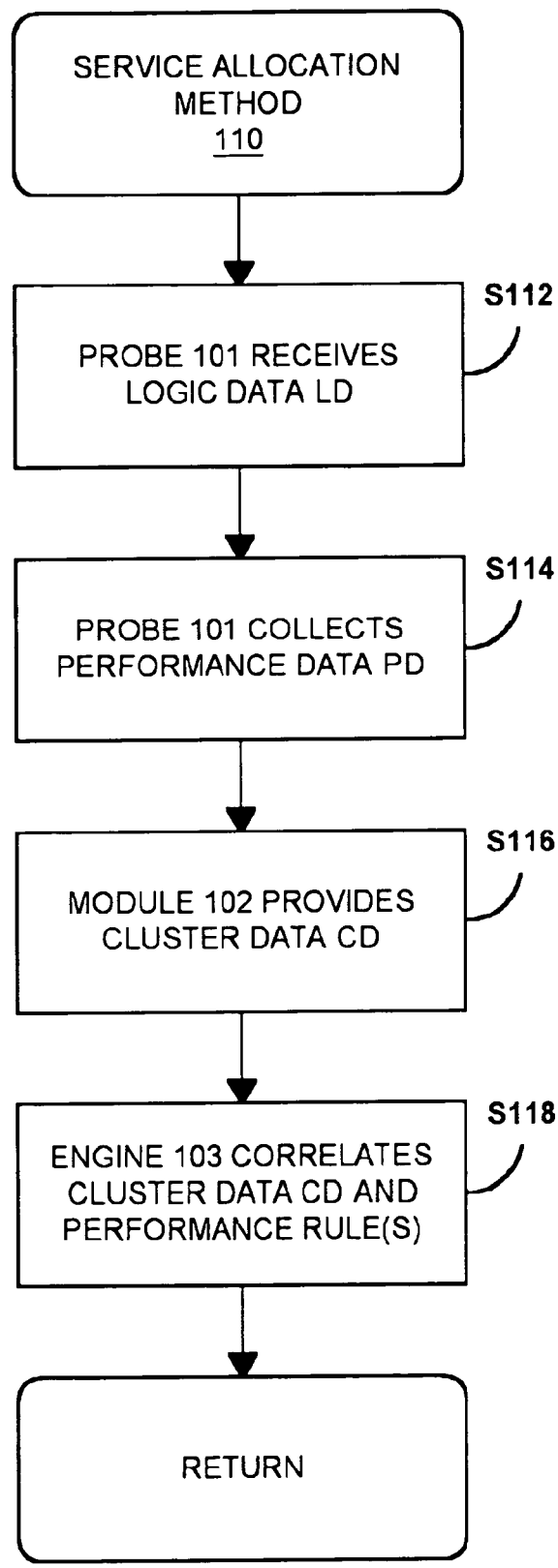
FIG. 2B is a flow chart illustrating one embodiment of a service allocation method in accordance with the present invention.

Referring to FIGS. 1A, 2A and 2B, a service allocation device 100 in accordance with the present invention and a service allocation method 110 in accordance with the present invention are shown, respectively. Service allocation device 100 is installed within or accessible by one or more servers 21, 31, 41, 51, 61, and 71 to facilitate an optimal allocation of services between servers 21, 31, 41, 51, 61, and 71. Service allocation device 100 includes a probe 101, a module 102, and an engine 103.

During stage S112 of method 110, probe 101 receives logical data LD from representative of the logical configuration of distributed data processing system 10. Specifically, logical data LD includes data indicating distributed data processing system 10 includes six (6) networks, six (6) servers, and sixteen (16) servers. Logical data LD also includes data indicating the interconnections of distributed data processing system 10 as previously described herein in connection with FIG. 1A. Logical data LD can be provided to probe 101 from a variety of sources as would occur to those of ordinary skill in the art, such as, for example, a database storing logical data LD, or a program for dynamically collecting logical data LD.

During stage S114 of method 110, probe 101 utilizes logical data LD to collect performance data PD representative of the physical characteristics of distributed data processing system 10 as would occur to those of ordinary skill in the art. Performance data PD can include a round trip time, a hop count, and a bottleneck speed as measured from each server 21, 31, 41, 51, 61, and 71. For example, a round trip time indicating the mean communication time between server 21 and each client 22, 23, 32-24, 42-44, 52, 53, 62-64, and 72-74 can be measured by probe 101. Also by example, a hop count indicating server 31 and server 41 are required to route a service from server 21 to client 43 can be measured by probe 101. Another example is a bottleneck speed indicating a lowest link speed between server 21 and client 63 can be measured by probe 101.

Figure 3A:
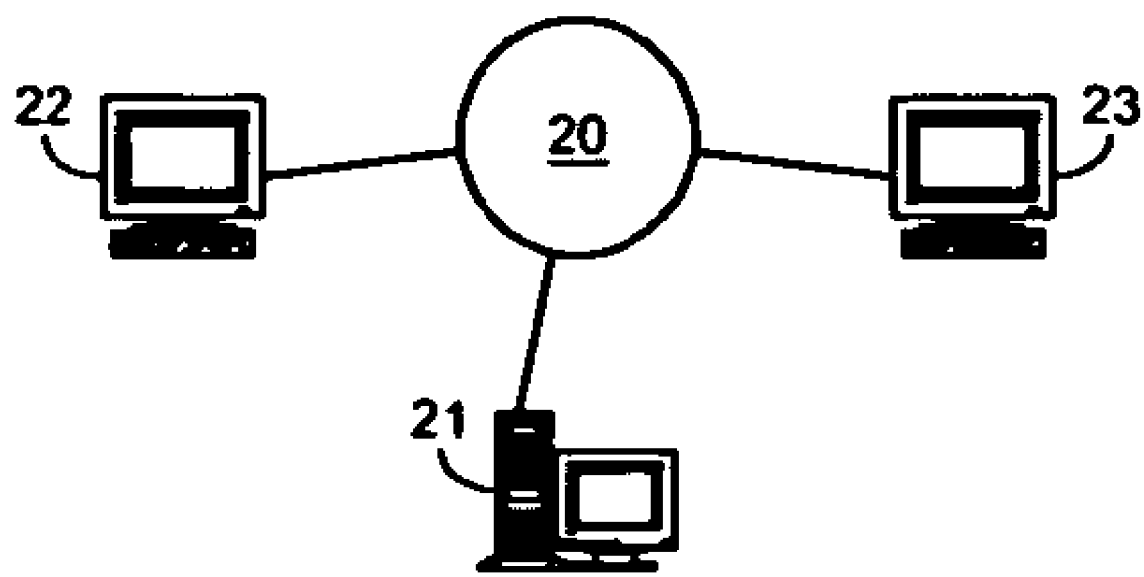
FIG. 3A is a schematic diagram of a first exemplary cluster.
Figure 3B:
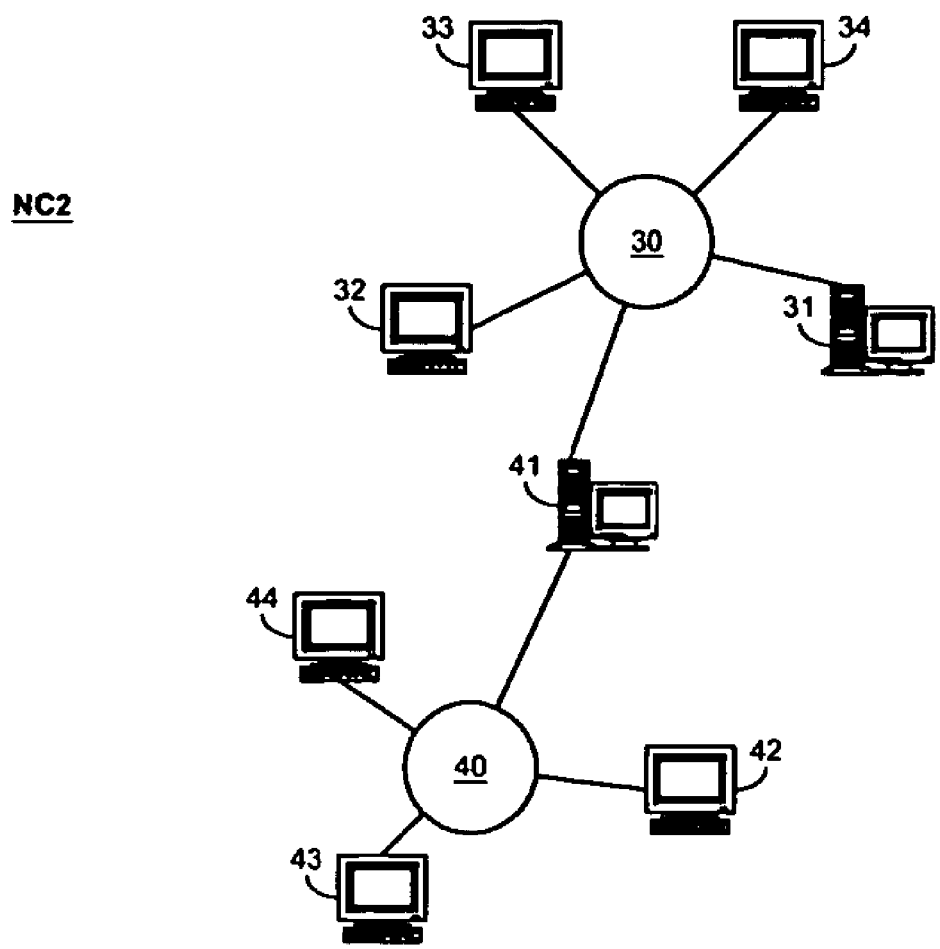
FIG. 3B is a schematic diagram of a second exemplary cluster.
Figure 3C:
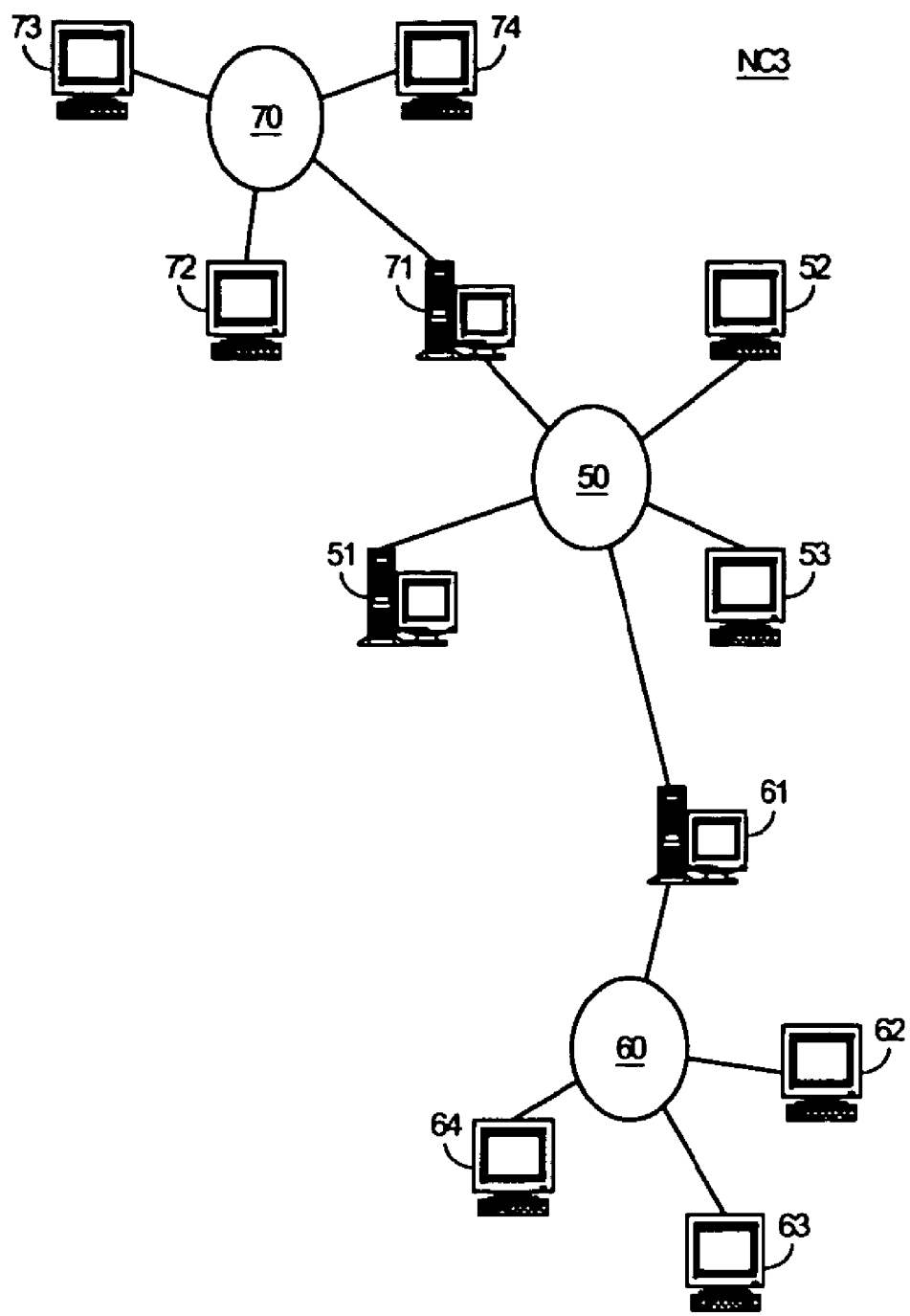
FIG. 3C is a schematic diagram of a third exemplary cluster.

During stage S116 of method 110, module 102 utilizes performance data PD to provide cluster data CD that identifies each node cluster within distributed data processing system 10. A node cluster is an aggregation of nodes of distributed data processing system 10 that can be viewed as one node for purposes of providing the network service for distributed data processing system 10. For example, based on performance data PD, cluster data CD can identify a node cluster NC1 as shown in FIG. 3A, a node cluster NC2 as shown in FIG. 3B, and a node cluster NC3 as shown in FIG. 3C.

Referring again to FIGS. 1, 2A and 2B, in one embodiment, module 102 inputs performance data PD into a Self Organizing Feature Map neural network to output cluster data CD as would occur to those of ordinary skill in the art. The Self Organizing Feature Map can be an artificial neural network having the advantages of, as those of ordinary skill in the art would appreciate, allowing a generalization of performance data PD and enabling an approximation of cluster data CD.

Engine 103 includes one or more performance rules that a server within a node cluster is required to comply with in supporting the network service for distributed data processing system 10. During stage S118 of method 110, engine 103 correlates cluster data CD with the performance rule(s). Depending on the number of performance rules and the degree of specificity of each performance rule, the correlation of cluster data CD with the performance rule(s) yields a map of each node cluster of cluster data CD complying with the performance rule(s) and/or a list of one or more servers within a node cluster of cluster data CD that comply with the performance rule(s).

For example, a performance rule may limit an installation of a logging service within node clusters having three (3) or more servers. A correlation node cluster NC1 (FIG. 3A), node cluster NC2 (FIG. 3B), and node cluster NC3 (FIG. 3C) with this performance rule would yield a map of node cluster NC3 as the node cluster for supporting the logging service. An administrator of distributed data processing system 10 can thereafter selectively install the logging service at server 51, server 61, and/or server 71 as shown on the map.

Also by example, a performance rule no. 1 may limit an installation of a logging service within node clusters having two (2) servers, and a performance rule no. 2 may limit an installation of the logging service on a server being connected to two or more networks. A correlation node cluster NC1, node cluster NC2, and node cluster NC3 with performance rule no. 1 and performance rule no. 2 would yield server 31 of node cluster NC2 as the site for supporting the logging service. An administrator of distributed data processing system 10 can thereafter install the logging service at server 31.

Referring to FIGS. 2A and 2B, from the description herein of service allocation device 100 and service allocation method 110, those of ordinary skill in the art will know how to use service allocation device 100 and service allocation method 110 for distributed data processing systems other than distributed data processing system 10 (FIG. 1A). Additionally, the present invention does not limit the array of performance data PD and performance rules than can be implemented with a service allocation device and a service allocation method in accordance with the present invention. Those of ordinary skill in the art will therefore appreciate and know how to select performance data PD and performance rule as needed to thereby adapt a service allocation device and a service allocation method in accordance with the present invention to any given service of a distributed data processing system. Particularly, distributed data processing systems having more complex logical configurations than the logical configuration of distributed data processing system 10.

It is important to note that while the present invention has been described in the context of a fully functioning data processing system, those of ordinary skill in the art will appreciate that the processes of the present invention are capable of being distributed in the forms of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, CD-ROM, and transmission-type media, such as digital and analog communications links.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A distributed data processing system, comprising:
   a server operable to allocate a service in the distributed data processing system, said server including:
   a probe operable to collect a set of performance data representative of a set of physical characteristics of the distributed data processing system to form a collection of a set of performance data,
   a module operable to provide, using said collection of a set of performance data, cluster data that identifies a plurality of node clusters in said distributed data processing system, wherein a node cluster comprises an aggregation of nodes;
   an engine operable to correlate at least one property of each of the identified plurality of node clusters with at least one performance rule required for supporting the service to determine a compliance of each of the plurality of node clusters to the at least one performance rule for supporting said service;
   a mechanism for showing each node cluster of the plurality of node clusters that complies with the at least one performance rule for supporting the service; and
   a mechanism for allocating the service to one of the node clusters that complies with the at least one performance rule, wherein the mechanism for showing each node cluster of the plurality of node clusters that complies with the at least one performance rule for supporting the service, comprises a mechanism for showing a map of each node cluster of the plurality of node clusters that complies with the at least one performance rule for supporting the service, and wherein the mechanism for allocating the service to one of the node clusters that complies with the at least one performance rule, comprises a mechanism for allocating the service to one of the node clusters that complies with the at least one performance rule based on the map.

2. The system of claim 1, wherein a round trip time is a first performance data of said set of performance data.

3. The system of claim 1, wherein a hop count is a first performance data of said set of performance data.

4. The system of claim 1, wherein a bottleneck link speed is a first performance data of said set of performance data.

5. The system of claim 1, wherein said module is a neural network.

6. A computer program product, comprising:
   a non-transitory computer readable storage medium having computer usable instructions for allocating a service in a distributed data processing system, the computer program product comprising:
   instructions for collecting a set of performance data representative of a set of physical characteristics of the distributed data processing system to form a collection of a set of performance data;
   instructions for providing, using said collection of a set of performance data, cluster data that identifies a plurality of node clusters in said distributed data processing system, wherein a node cluster comprises an aggregation of nodes;
   instructions for correlating at least one property of each of the identified plurality of node clusters with at least one performance rule required for supporting the service to determine a compliance of each of the plurality of node clusters to the at least one performance rule for supporting the service;
   instructions for showing each node cluster of the plurality of node clusters that complies with the at least one performance rule for supporting the service; and
   instructions for allocating the service to one of the node clusters that complies with the at least one performance rule, wherein the instructions for showing each node cluster of the plurality of node clusters that complies with the at least one performance rule for supporting the service, comprises instructions for showing a map of each node cluster of the plurality of node clusters that complies with the at least one performance rule for supporting the service, and wherein the instructions for allocating the service to one of the node clusters that complies with the at least one performance rule, comprises instructions for allocating the service to one of the node clusters that complies with the at least one performance rule based on the map.

7. The computer program product of claim 6, wherein a round trip time is a first performance data of said set of performance data.

8. The computer program product of claim 6, wherein a hop count is a first performance data of said set of performance data.

9. The computer program product of claim 6, wherein a bottleneck link speed is a first performance data of said set of performance data.

10. The computer program product of claim 6, wherein a neural network executes the instructions for providing cluster data that identifies a plurality of node clusters in said distributed data processing system.

* * * * *